(12) United States Patent
Rydbeck

(10) Patent No.: US 6,922,567 B1
(45) Date of Patent: Jul. 26, 2005

(54) SYSTEMS, METHODS AND COMPUTER PROGRAM PRODUCTS FOR IDENTIFYING ITEMS OF INTEREST THAT ARE GEOGRAPHICALLY PROXIMATE TO WIRELESS COMMUNICATOR USERS

(75) Inventor: Nils R. Rydbeck, Cary, NC (US)

(73) Assignee: Telefonaktiebolaget L.M. Ericsson (SE)

(*) Notice: Subject to any disclaimer, the term of this patent is extended or adjusted under 35 U.S.C. 154(b) by 702 days.

(21) Appl. No.: 09/643,603

(22) Filed: Aug. 22, 2000

(51) Int. Cl.7 .............................................. H04Q 7/20

(52) U.S. Cl. .............................. 455/456.3; 455/412.2; 455/414.2

(58) Field of Search ................................ 455/456, 457, 455/412, 414, 417

(56) References Cited

U.S. PATENT DOCUMENTS

| | | |
|---|---|---|
| 5,067,081 A | 11/1991 | Person |
| 5,327,144 A | 7/1994 | Stilp et al. .................. 342/387 |
| 5,479,482 A | 12/1995 | Grimes ........................ 379/59 |
| 5,559,864 A | 9/1996 | Kennedy, Jr. ................ 379/59 |
| 5,625,668 A | 4/1997 | Loomis et al. ............... 379/58 |
| 5,663,734 A | 9/1997 | Krasner ...................... 342/357 |
| 5,680,119 A | 10/1997 | Magliari et al. ............. 340/904 |
| 5,687,215 A | 11/1997 | Timm et al. .................. 379/58 |
| 5,689,548 A | 11/1997 | Maupin et al. ............... 379/59 |
| 5,712,899 A | 1/1998 | Pace, II ...................... 379/58 |
| 5,712,900 A | 1/1998 | Maupin et al. ............... 379/59 |
| 5,724,660 A | 3/1998 | Kauser et al. ............... 455/456 |
| 5,737,700 A | 4/1998 | Cox et al. .................... 455/414 |
| 5,797,091 A | 8/1998 | Clise et al. .................. 455/404 |
| 5,797,092 A | 8/1998 | Cox et al. .................... 455/404 |
| 5,832,059 A | 11/1998 | Aldred et al. ................ 379/34 |
| 5,873,040 A | 2/1999 | Dunn et al. .................. 455/456 |
| 5,918,180 A | 6/1999 | Dimino ........................ 455/456 |
| 5,937,160 A | 8/1999 | Davis et al. ............ 395/200.33 |
| 5,937,355 A | 8/1999 | Joong et al. ................. 455/466 |
| 5,959,529 A | 9/1999 | Kail, IV ...................... 340/539 |
| 5,960,341 A | 9/1999 | LeBlanc et al. ............. 455/426 |
| 5,963,130 A | 10/1999 | Schlager et al. ............. 340/540 |
| 5,963,861 A | 10/1999 | Hanson ....................... 455/422 |

(Continued)

FOREIGN PATENT DOCUMENTS

| | | |
|---|---|---|
| WO | WO 98/52379 | 11/1998 |
| WO | WO 98/59506 | 12/1998 |
| WO | WO 99/11078 | 3/1999 |
| WO | WO 00/04730 | 1/2000 |
| WO | WO 00/22860 | 4/2000 |

OTHER PUBLICATIONS

International Search Report, International Application No. PCT/US01/21583, dated Mar. 6, 2002.

*Primary Examiner*—Lee Nguyen
(74) *Attorney, Agent, or Firm*—Myers Bigel Sibley & Sajovec (57) ABSTRACT

Systems, methods, and computer program products for identifying items of interest within a predetermined proximity of a geographic location of a user of a wireless communicator, or of geographic locations of interest to a user, are provided. A communications network carrier detects (or receives) a geographic location of (or from) a user. The distance between the detected (or received) geographic location and one or more items of interest to the user is determined. User interests are registered with the carrier (or with a third party). A determination is made whether the detected or received geographic location is within a predetermined proximity of an item associated with a registered interest to the user. If one or more items of interest to the user are within a predetermined proximity of the geographic location, the user is notified of the existence of the one or more items of interest. Additional information about each item of interest may also be provided.

71 Claims, 7 Drawing Sheets

U.S. PATENT DOCUMENTS

| | | | |
|---|---|---|---|
| 5,973,643 A | 10/1999 | Hawkes et al. | 342/457 |
| 5,982,324 A | 11/1999 | Watters et al. | 342/357.06 |
| 5,983,109 A | 11/1999 | Montoya | 455/456 |
| 5,991,739 A | 11/1999 | Cupps et al. | |
| 6,009,355 A | 12/1999 | Obradovich et al. | 701/1 |
| 6,014,090 A * | 1/2000 | Rosen et al. | 340/905 |
| 6,031,894 A | 2/2000 | Fleming, III | 379/44 |
| 6,044,257 A | 3/2000 | Boling et al. | 455/404 |
| 6,061,561 A | 5/2000 | Alanara et al. | 455/422 |
| 6,064,722 A | 5/2000 | Clise et al. | 379/37 |
| 6,321,090 B1 * | 11/2001 | Soliman | 455/440 |

* cited by examiner

SYSTEMS, METHODS AND COMPUTER PROGRAM PRODUCTS FOR IDENTIFYING ITEMS OF INTEREST THAT ARE GEOGRAPHICALLY PROXIMATE TO WIRELESS COMMUNICATOR USERS

CROSS-REFERENCE TO RELATED APPLICATION

The present application is related to commonly assigned U.S. patent application Ser. No. 09/643,602, entitled Methods, Mobile User Terminals, and Systems for Controlling Access to Mobile User Terminal Location Information, filed concurrently herewith, the entire disclosure of which is incorporated herein by reference.

FIELD OF THE INVENTION

The present invention relates generally to telecommunications and, more particularly, to mobile telecommunications.

BACKGROUND OF THE INVENTION

With the advent and development of mobile telecommunications systems and technologies, the use of wireless communication devices, such as radiotelephones, is increasing worldwide. As such, users may becoming decreasingly bound to wireline terminals or devices for telecommunications functions. Moreover, calling parties may not need to know where a user of a wireless communications device is physically located in order to establish a call with the user.

Notwithstanding the benefits of mobile telecommunications, it would be desirable in certain situations to communicate with a mobile user based on the physical location of the mobile user. Moreover, it would be desirable to mobile telecommunications users to receive information that is geographically-specific. Unfortunately, such services may be limited and may not be widely available.

SUMMARY OF THE INVENTION

In view of the above, the present invention provides systems, methods, and computer program products for identifying items of interest within a predetermined proximity of a geographic location of a user of a wireless communicator, or of a geographic location of interest to the user. According to an embodiment of the present invention, a wireless communicator (e.g., a radiotelephone) communicates via a communications network operated by a carrier. The carrier detects the geographic location of the wireless communicator, or alternatively, receives an identification of the geographic location of the wireless communicator from the wireless communicator. The distance between the detected (or received) geographic location of the wireless communicator and one or more items of interest to the user is determined.

Each user has interests (e.g., hobbies, professional interests, vacation interests, and the like) registered with the carrier (or with a third party). Furthermore, geographic locations of items (e.g., commercial and non-commercial entities, such as stores, landmarks, tourist spots, historical places, and the like) that are associated with these interests are also maintained by the carrier (or by a third party). A determination is made whether the detected (or received) geographic location of the wireless communicator is within a predetermined proximity of an item of interest to the user.

If one or more items of interest to the user are within a predetermined proximity of the geographic location of the wireless communicator (i.e., the user's location), the user of the wireless communicator is notified of the existence-of the one or more items of interest. User notification may be accomplished in various ways. For example, the communications network may support short message service (SMS) and user notification may include sending SMS messages to the wireless communicator. Alternatively, user notification may include sending voice communications to the user via the wireless communicator.

Preferably, the value of a "predetermined proximity" is user configurable. It is preferred that the value of a predetermined proximity be different for different items of interest. Moreover, it is preferred that a user be able to modify proximity values via his/her wireless communicator or via other communications devices.

According to another embodiment of the present invention, a user who has been notified of one or more items of interest that are within a predetermined proximity of the user's location may be given the opportunity to obtain additional information (i.e., more information than just the geographic location of the one or more items of interest) about the one or more items of interest. If the user wishes to receive additional information, the additional information may be provided to the user in various ways. For example, additional information may be included with a notification sent to a user or may be attached to the notification, for example as a document. Additionally, this additional information may be provided via a pointer, such as a wireless application protocol (WAP)—compatible uniform resource locator (URL), that is displayed within a user interface or display of a wireless communicator and that a user may activate to retrieve the additional information from a web site or other external source.

According to another embodiment of the present invention, a communications network carrier may seek authorization from the user to forward the geographic location information (received or detected) to a third party that maintains interests of users and location and other information about items that are associated with user interests. The third party receiving the geographic location information then determines the distance between the detected (or received) geographic location of the wireless communicator and one or more items of interest to the user of the wireless communicator. According to this embodiment of the present invention, users register their interests with the third party. Furthermore, geographic locations of items (e.g., commercial and non-commercial entities) that are associated with these interests are also registered with and maintained by the third party. The third party determines whether the geographic location of the wireless communicator is within a predetermined proximity of an item of interest to the user. If items of interest are within a predetermined proximity of the geographic location, the user of the wireless communicator is notified of the one or more items of interest.

According to another embodiment of the present invention, a user may send his or her geographic location to a communications network carrier (or to a third party) via his/her wireless communicator. Preferably, the user's wireless communicator is configured with a navigational system, such as a Global Positioning System (GPS), that is configured to determine a geographic location of the wireless communicator. In response, the user receives from the communications network carrier (or from a third party) information about one or more items of interest to the user that are located within a predetermined proximity of the reported geographic location of the user.

According to another embodiment of the present invention, a communications network carrier (or third party)

may receive an identification of a geographic location from a user, either via a wireless communicator or a wireline communications device. The carrier (or third party) receiving the geographic location information determines the distance between the identified geographic location and one or more items of interest to the user. The carrier (or third party) determines whether the geographic location of the wireless communicator is within a predetermined proximity of an item of interest to the user. If there are one or more items of interest within a predetermined proximity of the identified geographic location, the user of the wireless communicator is notified of the one or more items of interest.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as methods, devices, systems, and/or computer program products. Accordingly, the present invention may take the form of an entirely hardware embodiment, an entirely software embodiment or an embodiment combining software and hardware aspects. Software embodiments of the present invention do not depend on implementation with a particular programming languages The present invention is also described using flowchart illustrations and block diagrams. It will be understood that each block (of the flowchart illustrations and block diagrams), and combinations of blocks, can be implemented by computer program instructions. These program instructions may be provided to a processor(s) within mobile user terminals (e.g., wireless communicators) and/or within a communications system, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

Although the present invention is described herein by reference to radiotelephones, it will be understood that the present invention can be embodied in other types of wireless communicators such as portable computers, handheld computers, personal digital assistants (PDAs), and-the like. In addition, the present invention-may be embodied in a type of radiotelephone commonly referred to as a web phone or web-enabled radiotelephone.

Radiotelephones generally refer to communications terminals which provide a wireless communications link to one or more other communications terminals. Radiotelephones may be used in a variety of different applications, including cellular telephone, land-mobile (e.g., police and fire departments), and satellite communications systems. Hereinafter, the terms "wireless communicator" and "radiotelephones" shall be used interchangeably.

Figure 1:
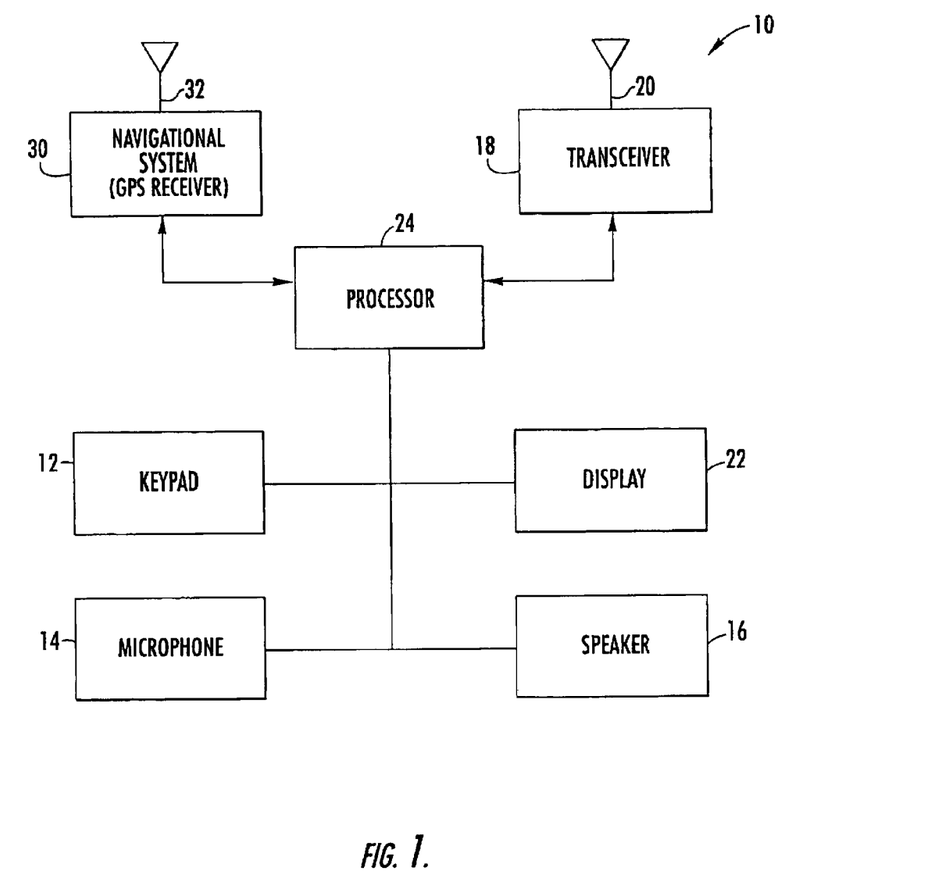
FIG. 1 is a block diagram that illustrates embodiments of a wireless communicator that may be used in accordance with the present invention.

FIG. 1 is a block diagram of a radiotelephone 10, according to embodiments of the present invention. The radiotelephone 10 can be used to communicate within a wireless communications system operated by a carrier. In the telecommunications industry, a carrier is a telephone or other company that sells or rents telecommunication transmission services. A local exchange carrier (LEC) is a local phone company and an inter-exchange carrier (IEC or IXC) carries long-distance calls.

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems, such as those conforming to the North American standard IS-54 and the European standard GSM, have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data).

As shown in FIG. 1, the radiotelephone 10 includes a keypad 12 which can be used to provide input to the radiotelephone 10. The keypad 12 can include a plurality of keys that provide input to the radiotelephone 10 when pushed. For example, when the user wishes to initiate a call in a wireless communications system, the user pushes a series of keys that correspond to the number to be dialed. During the call, the user can speak into a microphone 14 which causes the radiotelephone 10 to generate communication signals which are transmitted from the radiotelephone 10. The user may listen to a speaker 16 that produces audio signals generated by the radiotelephone 10 from communication signals received by the radiotelephone 10 during a call. The radiotelephone 10 transmits and receives the communication signals via a transceiver 18 over an antenna 20.

During operation, the user may refer to a display 22 of the radiotelephone 10 to observe information relevant to the operation of the radiotelephone 10, such as characters or numbers. For example, the display 22 can be a Liquid Crystal Display (LCD) that displays, for example, a telephone number entered by the user or a name stored in the radiotelephone 10. The display 22 may also be used in conjunction with the keypad 12 such as when the user dials a number to place a call.

It will be understood that the functions of keypad 12 and the display 22 can be provided by a user interface to the radiotelephone 10. For example, the user interface can be a touch screen through which the user can view computer displayable documents, provide input thereto, and control the radiotelephone 10.

A processor 24 provides the communications signals to the transceiver 18 for transmission and receives the communications signals from the transceiver 18 for reception. For example, the processor 24 provides communications signals to the transceiver 18 when the user speaks into the microphone 14 and receives communications signals from the transceiver 18 for the reproduction of audio through the speaker 16. The processor 24 generates characters for display on the display 22. For example, the processor 24 generates numbers for display when the user enters a telephone number on the keypad 12. Characters can also be generated by a character generator which is not shown. The microphone 14, speaker 16, keypad 12, and display 22 are coupled to the processor 24 which controls operations of the radiotelephone 10.

A radiotelephone 10, according to embodiments of the present invention, may include a navigational system 30 and an antenna 32. The navigational system 30 and antenna 32 can receive signals used to determine location information associated with the radiotelephone 10. The antenna 32 and the antenna 20 may be combined into a single antenna. In some embodiments, the navigational system 30 and antenna 32 are a Global Positioning System (GPS) receiver and antenna which receive GPS signals used to provide latitude and longitude information to the processor 24. The processor 24 can use the latitude and longitude information to determine the geographic location of the radiotelephone 10.

In other embodiments, geographic location information may be determined by receiving signals from a wireless communications system as described, for example, in U.S. Pat. No. 5,982,324 to Watters et al., the disclosure of which is incorporated herein by reference in its entirety. Radiotelephones used in accordance with various embodiments of the present invention may use other methods and/or systems to determine geographic location information. In some embodiments the location information can be a cell or base station number in a wireless communications system, an address, or other information that can be used to indicate a geographic location of the radiotelephone 10.

Figure 2:
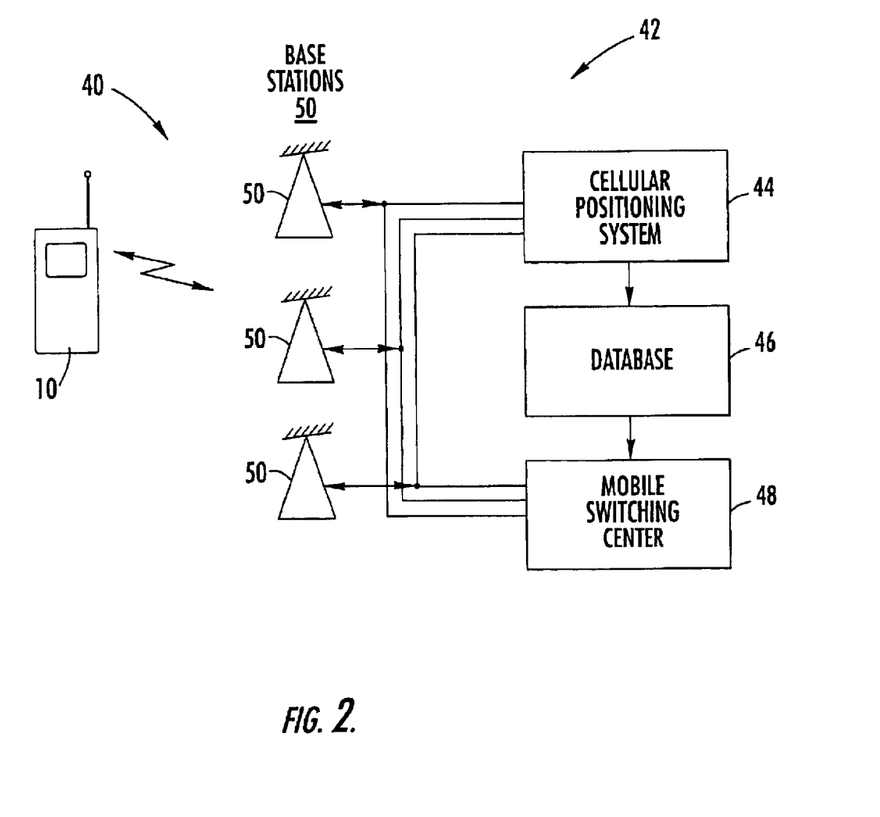
FIG. 2 is a block diagram that illustrates methods, wireless communicators, and systems for identifying items of interest to a user that are within a predetermined proximity of a geographic location of the user, according to an embodiment of the present invention.

FIG. 2 is a block diagram that illustrates embodiments of methods, wireless communicators, and systems (and wireless communicators and systems that may employ computer program products) for identifying items of interest to a user of a wireless communicator that are within a specific distance (referred to hereinafter as a "predetermined proximity") of a geographic location of the user, according to embodiments of the present invention. A system 40 configured to identify items of interest to a user of a wireless communicator that are within a predetermined proximity of a geographic location of the user, according to an embodiment of the present invention, includes a communications network 42 (such as a cellular radiotelephone network), operated by a carrier, a cellular positioning system 44, one or more databases 46, and a mobile switching center 48. The communications network 42 includes a plurality of geographically-dispersed base stations 44, as would be understood by those of skill in the art.

The term "database" refers to any type of data storage. The present invention is not limited to a particular type of database and/or other data storage technologies. Cellular positioning systems and mobile switching centers are well understood by those of skill in the art of radiotelephone communications and need not be described further herein.

The location of a wireless communicator (e.g., radiotelephone) 10 is tracked by the cellular positioning system (i.e., base-station equipment) 44 provided by the carrier. The database(s) 46 is maintained by the carrier (or by a third party) and includes information about various interests of a user, including geographic locations of businesses and places (collectively referred to as "items") associated with these user interests. Exemplary user interests may include professional interests, hobbies and recreational interests, vacation interests, religious interests, and the like. Exemplary items associated with user interests my include vacation spots, commercial businesses, religious institutions, tourist attractions, and the like.

As a user moves geographically, the cellular positioning system 44 detects the location of the user (i.e., the location of the radiotelephone 10). When a new location is detected (i.e., when the user has moved a predefined distance from a previous location), the detected geographic location of the radiotelephone is compared with information stored within the database(s) 46 about one or more items associated with interests of the user. When an item of interest is determined to have a geographic location that is within a predetermined proximity of the geographic location of the user, the user is notified via the mobile switching center 48.

Preferably, the predetermined proximity for an item of interest is configurable by a user via a radiotelephone 10. For example, a user may wish to be notified when items of interest are within 10 miles or 50 miles of his or her geographic location. A predetermined proximity, according to the present invention, may have virtually any value. A predetermined proximity, according to the present invention, may be stated in various dimensions including, but not limited to, feet, miles, meters, kilometers, and the like. Moreover, different values of a predetermined proximity may be associated with different interests. For example, a user may wish to be notified when he or she is within a one mile proximity of a pizza vendor. The same user may wish to be notified when he or she is within a fifty mile proximity of a Monet or Picasso exhibit.

As an example of an embodiment of the present invention, a user may establish an account and register one or more interests with a database keeper (e.g., a carrier or a third party in communication with a carrier). For example, a user may have an interest in collecting Civil War relics. Accordingly, this user "interests" is maintained in the database 46. Also stored in the database 46 are locations of items that are associated with a user's interests, for example, the locations of shops that sell Civil War relics (as well as Civil War battlefields). As the user travels, his or her location is detected and a determination is made whether any items of interest to the user are within a predetermined proximity of the detected location.

If it is determined that a user is within a predetermined proximity of an item of interest, the user is notified of his/her proximity to the item of interest. This notification may, for example, take the form of a cellular telephone call to the user. The telephone call may deliver a prerecorded message or a synthesized voice message to the user. Alternatively, notification may take the form of a text message sent over a carrier's short message service (SMS) or other messaging service. SMS is described, for example, in U.S. Pat. No. 5,915,222 to Olsson et al. entitled Transporting Short Message Service (SMS) Messages Within A Telecommunications Network which is assigned to the assignee of the present invention, the disclosure of which is incorporated herein by reference in its entirety.

According to additional embodiments of the present invention, a notification to a user may include additional information about one or more items of interest that are located within a predetermined proximity of the detected geographic location of the user. For example, directions to a shop that sells Civil War relics and the hours of operation of the shop may be provided to the user with the notification. It is understood that virtually any type of additional information may be provided to a user in accordance with the present invention.

Additional information may be included with the notification sent to a user or may be attached to the notification, for example as a document. Additionally, this additional information may be provided via a pointer, such-as a wireless application protocol (WAP)—compatible uniform resource locator (URL), that is displayed within a user interface or display of a radiotelephone 10 and that a user may activate to retrieve the additional information from a web site or other external source.

According to another embodiment of the a present invention, a database(s) containing information about the interests of users and information about items associated with user interests may be maintained by a third party. A radiotelephone according to embodiments of the present invention preferably is configured to allow a user to register one or more interests with a carrier and/or third party. A carrier may send the detected (or received) location of a user to the third party who then performs operations for comparing the detected (or received) geographic location of the user with geographic locations of items of interest to the user, and for notifying the user when one or more items of interest to the user are located within a predetermined proximity of the detected (or received) geographic location of the user. According to another embodiment of the present invention, a carrier may seek user authorization to send a detected (or received) location of the user to the third party.

Figure 3:
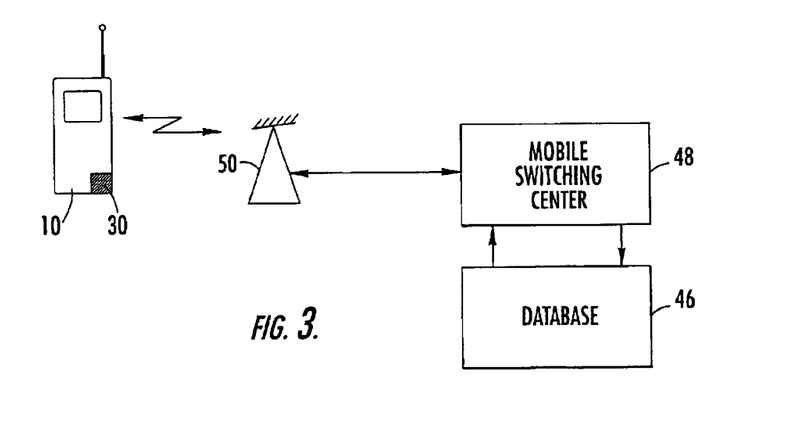
FIG. 3 is a block diagram that illustrates methods, wireless communicators, and systems for identifying items of interest to a user that are within a predetermined proximity of a geographic location of the user, according to additional embodiments of the present invention.

Referring now to FIG. 3, a wireless communicator 10, such as a radiotelephone, may be equipped with a navigational system 30, (such as a GPS receiver and antenna, as illustrated in FIG. 1). The navigational system 30 is configured to detect the geographic location of the radiotelephone. The radiotelephone 10 then sends its own geographic location directly to the carrier or to a third party via SMS or via a communications network control channel. The wireless communicator 10 may be configured to withhold transmission of its location if it has not moved recently. The wireless communicator 10 may also be configured to transmit its location only if it has been moved at least by a predetermined distance. The wireless communicator 10 may also be configured to transmit its location only during predetermined times of the day. Moreover, the wireless communicator 10 may also be configured to not transmit its location if it is within predefined geographic areas.

Figure 4:
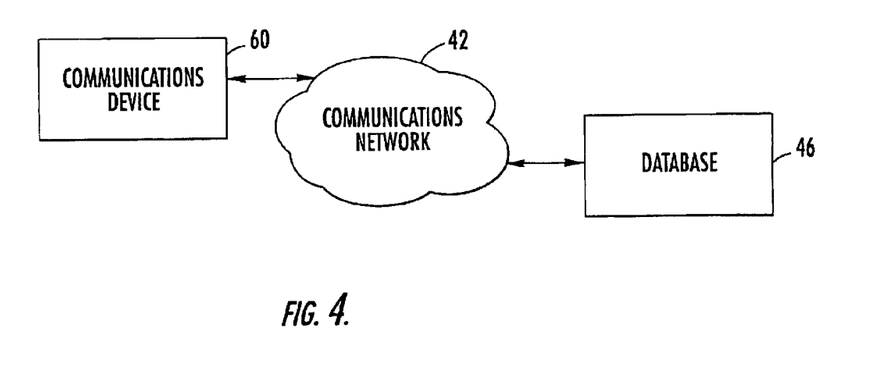
FIG. 4 is a block diagram that illustrates methods and systems for identifying items of interest to a user that are within a predetermined proximity of a geographic location, according to an embodiment of the present invention.

Referring to FIG. 4, another embodiment of the present invention is illustrated. A communications device 60, such as a fixed/wireline terminal, having a known geographic location to the communications network 42, is notified by the communications network 42, or by a third party, when an item of interest becomes registered within the database 46 maintained by the carrier, or by a third party, and the item of interest is associated with an interest of a user of the communications device 60 stored within the database 46. For example, if the user has a registered interest in "pizzas", the user is notified when a new pizza vendor opens shop within a predetermined proximity of the user's location and the pizza vendor has registered with the database 46.

According to another embodiment of the present invention, the communications device 60 may be notified of items of interest to the user when the user registers a new interest with the database 46 (and there are items of interest associated with the newly registered user interest registered with the database 46).

According to another embodiment of the present invention, a user may provide a communications network carrier (or a third party) with an identification of a geographic location, either via a wireless communications device 10 (FIG. 2) or via a fixed/wireline communications device 60 (FIG. 4) and receive information about items of interest in a predetermined proximity of the identified geographic location. For example, a user planning a trip to Iron City, W.Va., may like to know about items associated with interests of the user near Iron City, W.Va. If the user has an interest in ballet, and this interest is registered with a database 46 as described above, the user will be notified of ballet-related items within a predetermined proximity of Iron City, W.Va.

A carrier (or third party) may charge users for the above-described services. In addition, a carrier (or third party) may charge businesses and other entities that register with a database service according to embodiments of the present invention.

Figure 5:
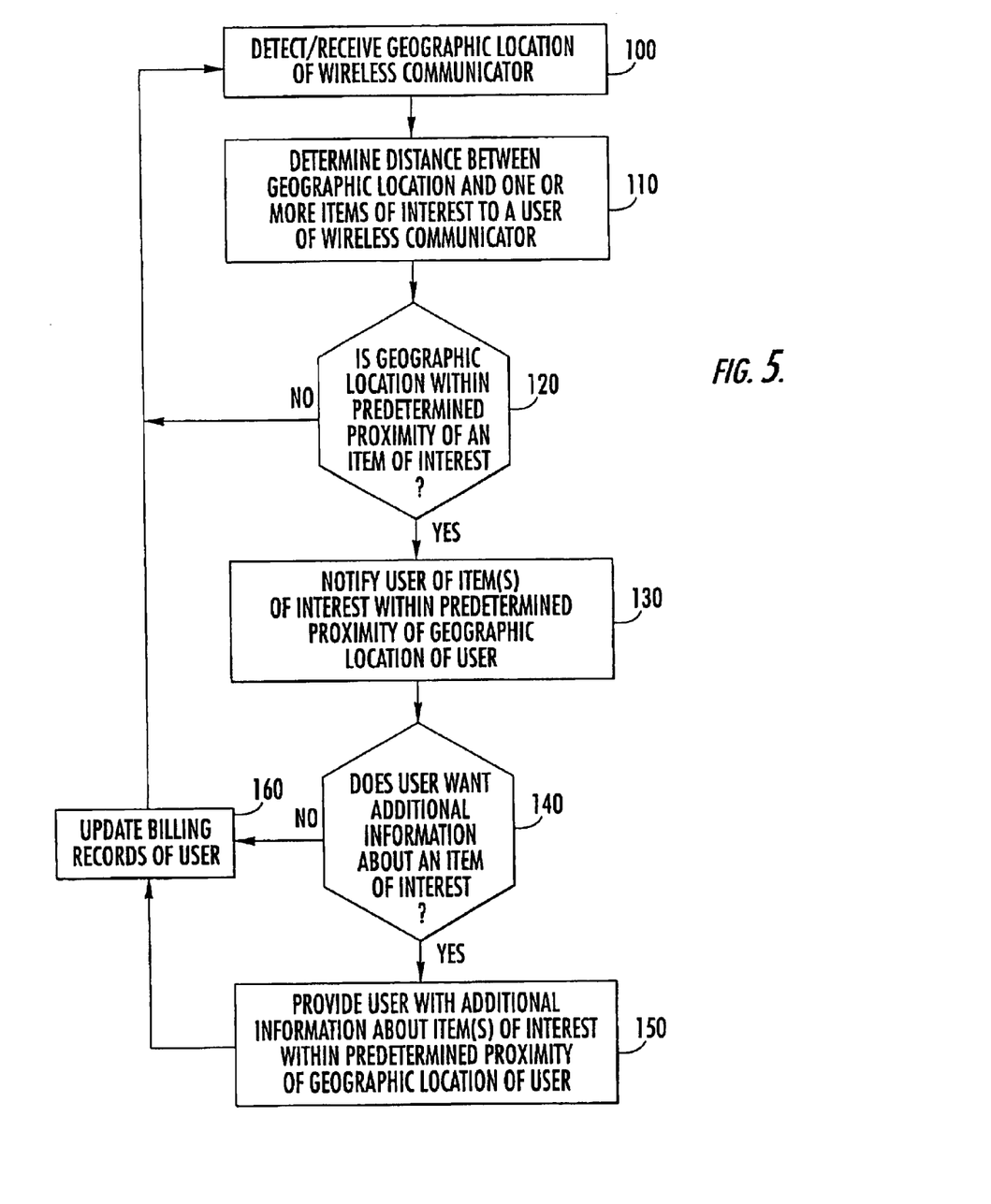
FIGS. 5–9 are flowcharts that illustrate operations for identifying items of interest to a user that are within a predetermined proximity of geographic locations, according to various embodiments of the the present invention.

Referring now to FIG. 5 operations for identifying items of interest within a predetermined proximity of a geographic location of a user of a wireless communicator, according to an embodiment of the present invention, are illustrated. The wireless communicator (e.g., a radiotelephone) communicates via a communications network operated by a carrier. The carrier detects (or receives) a geographic location of the wireless communicator (Block 100). For example, where the communications network is a cellular radiotelephone network having a plurality of geographically-dispersed base stations, detecting a geographic location of a radiotelephone may include determining which base station the radiotelephone is in communications with. Alternatively, a wireless communicator may transmit its geographic location to the carrier.

The distance between the detected (or received) geographic location of the wireless communicator and one or more items of interest to the user of the wireless communicator is determined (Block 110). As described above, each user has one or more interests registered with the carrier (or with a third party). Furthermore, geographic locations of items (e.g., commercial and non-commercial entities) that are associated with these interests are also maintained by the carrier (or by a third party). A determination is made whether the geographic location of the wireless communicator is within a predetermined proximity of an item of interest to the user (Block 120). The numerical value of the proximity may be user-configurable. For example, a user may request the carrier (or third party) to notify him/her of certain types of items of interest that are within "X" miles of his/her geographic location and of other types of items of interest that are within "Y" miles of his/her geographic location, wherein "X" and "Y" can be any value (and in any units of measurement of distance).

If the answer at Block 120 is "No", operations return to Block 100. If the answer at Block 120 is "Yes", the user of the wireless communicator is notified of one or more items of interest that are located within a predetermined proximity of the geographic location of the wireless communicator (i.e., the user) (Block 130). User notification may be accomplished in various ways. According to an embodiment of the present invention, the communications network may include a short message service (SMS) and user notification may include sending one or more SMS messages to the wireless communicator. According to another embodiment of the present invention, user notification may include sending a voice communication to the user via the wireless communicator.

According to another embodiment of the present invention, a user who has been notified of one or more items of interest that are within a predetermined proximity of the user's location may be given the opportunity to obtain additional information (i.e., more information than just the geographic location of the one or more items of interest) about the one or more items of interest (Block 140). If the user wishes to receive additional information (Block 140), the additional information may be provided to the user (Block 150) in various ways, as described above. For example, additional information may be included within the notification or may be attached to the notification, for example as a document. Additionally, this additional information may be provided via a pointer, such as a wireless application protocol (WAP)-compatible uniform resource locator (URL), that is displayed within a user interface or display of the wireless communicator and that a user may activate to retrieve the additional information from a web site or other external source.

If a user does not wish to receive additional information (Block 140), the user's billing records may be updated to reflect use of the notification service (Block 160), and operations return to Block 100. Similarly, after a user receives additional information (Block 150), the user's billing records may be updated to reflect use of the notification service (Block 160), and operations return to Block 100. In the illustrated embodiments, it is assumed that providing location and other information about items of interest to a user of a wireless communicator will be performed for a fee by a carrier and/or third party. As such, operations for updating the billing records for a user are included (Block 160). However, it is understood that providing location and/or other information about items of interest to a user in accordance with the present invention may be provided without charge to the user. As such, operations represented by Block 160 may be eliminated or may be performed in another manner.

Figure 6:
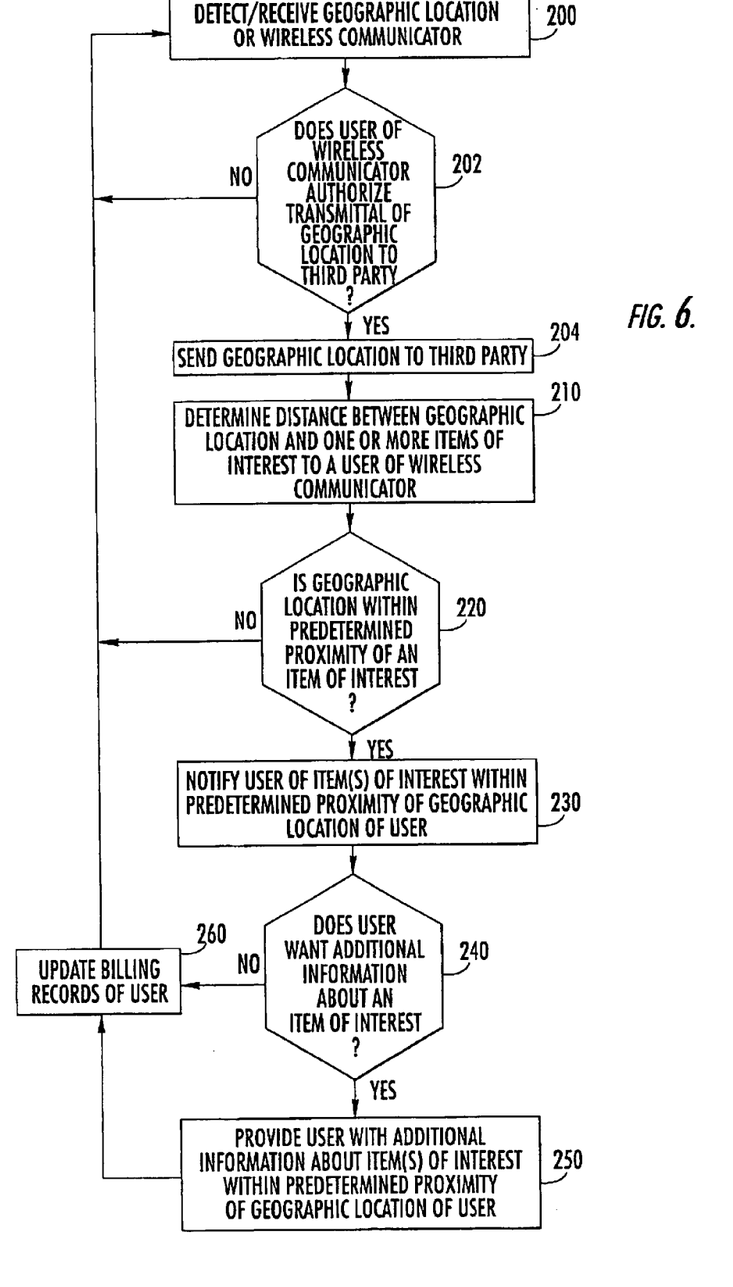

Referring now to FIG. 6, operations for identifying items of interest within a predetermined proximity of a geographic location of a user of a wireless communicator, according to another embodiment of the present invention, are illustrated. A communications network carrier detects (or receives) a geographic location of a wireless communicator (Block 200) as described above. The carrier seeks authorization from the user to forward the geographic location information to a third party that maintains interests of users and location and other information about items that are associated with user interests (Block 202). If the user grants authorization to the carrier, the carrier sends the geographic location information to the third party (Block 204). If the user does not grant authorization, operations return to Block 200).

The third party receiving the geographic location information then determines the distance between the detected (or received) geographic location of the wireless communicator and one or more items of interest to the user of the wireless communicator (Block 210). According to this embodiment of the present invention, users may register their interests with the third party. Furthermore, geographic locations of items (e.g., commercial and non-commercial entities) that are associated with these interests are also maintained by the third party. The third party determines whether the geographic location of the wireless communicator is within a predetermined proximity of an item of interest to the user (Block 220). If the answer at Block 220 is "No", operations return to Block 200. If the answer at Block 220 is "Yes", the user of the wireless communicator is notified of one or more items of interest to the user that are located within a predetermined proximity of the geographic location of the wireless communicator (i.e., the user) (Block 230). As described above, user notification may be accomplished in various ways, including, but not limited to, SMS communications and voice communications.

Additionally, a user who has been notified of one or more items of interest that are within a predetermined proximity of the user's location may be given the opportunity to obtain additional information (i.e., more information than just the geographic location of the one or more items of interest) about the one or more items of interest (Block 240). If the user wishes to receive additional information (Block 240), the additional information may be provided to the user (Block 250) in various ways, as described above.

If a user does not wish to receive additional information (Block 240), the user's billing records may be updated to reflect use of the notification service (Block 260), and operations return to Block 200. Similarly, after a user receives additional information (Block 250), the user's billing records may be updated to reflect use of the notification service (Block 260), and operations return to Block 200. As described above, operations represented by Block 260 may be eliminated or may be performed in another manner.

Figure 7:
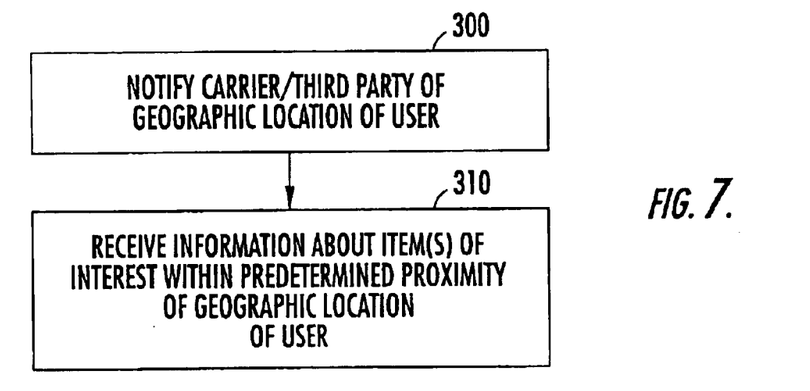

According to another embodiment of the present invention illustrated in FIG. 7, a user may send his or her geographic location to a communications network carrier (or to a third party) via his/her wireless communicator (Block 300). Preferably, the user's wireless communicator has a navigational system configured to determine its geographic location. An exemplary navigational system that may be utilized in accordance with the present invention includes, but is not limited to, a global positioning system (GPS). In response, the user receives from the communications network carrier (or from a third party) information about one or more items of interest to the user that are located within a predetermined proximity of the geographic location of the user (Block 310).

As described above, user notification may be accomplished in various ways, including, but not limited to SMS communications and voice communications. Additionally, a user who has been notified of one or more items of interest that are within a predetermined proximity of the user's location may be given the opportunity to obtain additional information (i.e., more information than just the geographic location of the one or more items of interest) about the one or more items of interest.

Figure 8:
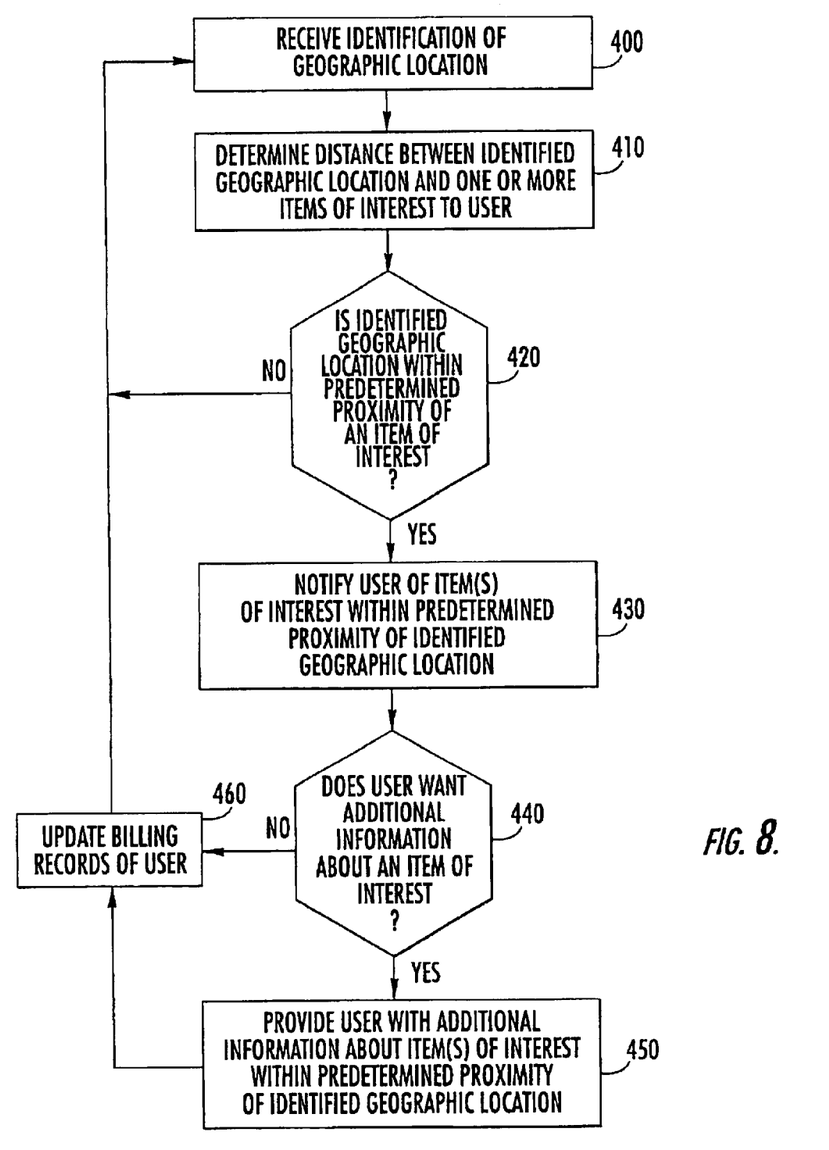

According to another embodiment of the present invention illustrated in FIG. 8, a communications network carrier (or a third party) receives an identification of a geographic location from a user, either via a wireless communicator or a wireline communications device (Block 400). The carrier (or third party) receiving the geographic location information then determines the distance between the geographic location and one or more items of interest to the user (Block 410). The carrier (or third party) determines whether the identified geographic location is within a predetermined proximity of an item of interest to the user (Block 420). If the answer at Block 420 is "No", operations return to Block 400. If the answer at Block 420 is "Yes", the user is notified of one or more items of interest to the user that are located within a predetermined proximity of the identified geographic location (Block 430). As described above, user notification may be accomplished in various ways, including, but not limited to SMS communications and voice communications.

Additionally, a user who has been notified of one or more items of interest that are within a predetermined proximity of a location of interest to the user may be given the opportunity to obtain additional information about the one or more items of interest (Block 440). If the user wishes to receive additional information (Block 440), the additional information may be provided to the user (Block 450) in various ways, as described above.

If a user does not wish to receive additional information (Block 440), the user's billing records may be updated to reflect use of the notification service (Block 460), and operations return to Block 400. Similarly, after a user receives additional information (Block 450), the user's billing records may be updated to reflect use of the notification service (Block 460), and operations return to Block 400. As described above, operations represented by Block 460 may be eliminated or may be performed in another manner.

Figure 9:
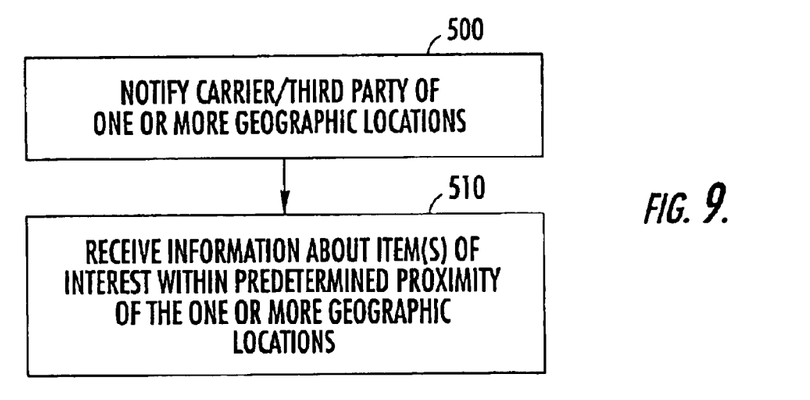

FIG. 9 illustrates operations performed by a user wishing to receive information about items of interest that are within a predetermined proximity of an identified geographic location. A user sends an identification of one or more geographic locations of interest to the user to a communications network carrier (or third party) (Block 500). In response, the user receives from the communications network carrier (or from a third party) information about one or more items of interest to the user that are located within a predetermined proximity of the geographic location(s) of interest to the user (Block 510). For example, as described above, a user planning a trip to Iron City, W.Va., may wish to know about items located near Iron City, W.Va. that are associated with interests of the user.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of identifying items of interest to a user of a wireless communicator that are within a predetermined proximity of a geographic location of the user, wherein the wireless communicator communicates via a communications network operated by a carrier, the method comprising the following steps:

detecting a geographic location of the wireless communicator;

obtaining user authorization to send the detected geographic location of the wireless communicator to a third party;

comparing the detected geographic location of the wireless communicator with a geographic location of one or more items of interest to the user;

automatically notifying the user responsive to the geographic location of the wireless communicator when one or more items of interest to the user are located within a predetermined proximity of the detected geographic location of the wireless communicator, and wherein the carrier sends the detected geographic location of the wireless communicator to the third party, and wherein the comparing and notifying steps are performed by the third party.

2. The method according to claim 1, wherein the wireless communicator is a radiotelephone and wherein the communications network is a cellular radiotelephone network having a plurality of geographically-dispersed base stations, and wherein the detecting step comprises determining which base station the wireless communicator is in communications with.

3. The method according to claim 1, wherein the predetermined proximity of a detected geographic location is configurable by the user via the wireless communicator.

4. The method according to claim 1, wherein the communications network includes a short message service (SMS) and wherein the notifying step comprises automatically sending an SMS message to the wireless communicator responsive to the geographic location of the wireless communicator.

5. The method according to claim 1, wherein the notifying step comprises automatically sending a voice communication to the wireless communicator responsive to the geographic location of the wireless communicator.

6. The method according to claim 1, wherein the notifying step further comprises the step of automatically providing the user with additional information about the one or more items of interest that are located within a predetermined proximity of the detected geographic location of the wireless communicator.

7. The method according to claim 1, wherein interests of the user and geographic location information for items associated with user interests are maintained by the carrier.

8. The method according to claim 1, wherein the carrier sends the detected geographic location of the wireless communicator to the third party if user authorization is obtained.

9. A method of identifying items of interest to a user of a wireless communicator that are within a predetermined proximity of a geographic location of the user, wherein the wireless communicator communicates via a communications network operated by a carrier, the method comprising the following steps:

receiving information from the wireless communicator that indicates a geographic location of the wireless communicator;

obtaining user authorization to send the detected geographic location of the wireless communicator to a third party;

comparing the geographic location of the wireless communicator with a geographic location of one or more items of interest to the user; and automatically notifying the user responsive to the geographic location of the wireless communicator when one or more items of interest to the user are located within a predetermined proximity of the geographic location of the wireless communicator;

wherein the carrier sends the detected geographic location of the wireless communicator to the third party, and wherein the comparing and notifying steps are performed by the third party.

10. The method according to claim 9, wherein the wireless communicator has a navigational system configured to determine a geographic location of the wireless communicator.

11. The method according to claim 10, wherein the navigational system of the wireless communicator comprises a global positioning system (GPS) receiver.

12. The method according to claim 9, wherein the communications network includes a short message service (SMS) and wherein the receiving step comprises receiving an SMS message from the wireless communicator.

13. The method according to claim 9, wherein the predetermined proximity of the geographic location of the wireless communicator is configurable by the user via the wireless communicator.

14. The method according to claim 9, wherein the communications network includes a short message service (SMS) and wherein the notifying step comprises sending an SMS message to the wireless communicator.

15. The method according to claim 9, wherein the notifying step comprises automatically sending a voice communication to the wireless communicator responsive to the geographic location of the wireless communicator.

16. The method according to claim 9, wherein the notifying step further comprises the step of providing the user with additional information about the one or more items of interest that are located within a predetermined proximity of the detected geographic location of the wireless communicator.

17. The method according to claim 9, wherein interests of a user and geographic location information about items associated with user interests are maintained by the carrier.

18. The method according to claim 9, wherein the carrier sends the detected geographic location of the wireless communicator to the third party if user authorization is obtained.

19. A system that identifies items of interest to a user of a wireless communicator that are within a predetermined proximity of a geographic location of the user, comprising:

a communications network operated by a carrier;

means for detecting a geographic location of the wireless communicator when the wireless communicator communicates via the communications network;

means for obtaining user authorization to send the detected geographic location of the wireless communicator to a third party system;

means for sending the detected geographic location of the wireless communicator to the third party system, wherein the third party system comprises:

means for comparing the detected geographic location of the wireless communicator with a geographic location of one or more items of interest to the user; and means for automatically notifying the user responsive to the geographic location of the wireless communicator when one or more items of interest to the user are located within a predetermined proximity of the detected geographic location of the wireless communicator.

20. The system according to claim 19, wherein the wireless communicator is a radiotelephone and wherein the communications network is a cellular radiotelephone network having a plurality of geographically-dispersed base stations, and wherein the detecting means comprises means for determining which base station the wireless communicator is in communications with.

21. The system according to claim 19, wherein the predetermined proximity of a detected geographic location is configurable by the user via the wireless communicator.

22. The system according to claim 19, wherein the communications network includes a short message service (SMS) and wherein the notifying means comprises means for automatically sending an SMS message to the wireless communicator responsive to the geographic location of the wireless communicator.

23. The system according to claim 19, wherein the notifying means comprises means for automatically sending a voice communication to the wireless communicator responsive to the geographic location of the wireless communicator.

24. The system according to claim 19, wherein the notifying means further comprises means for providing the user with additional information about the one or more items of interest that are located within a predetermined proximity of the detected geographic location of the wireless communicator.

25. The system according to claim 19, wherein interests of the user and geographic location information for items associated with user interests are maintained by the carrier.

26. The system according to claim 19, wherein the means for sending the detected geographic location comprises a means for sending the detected geographic location of the wireless communicator to the third party system if user authorization is obtained.

27. A system that identifies items of interest to a user of a wireless communicator that are within a predetermined proximity of a geographic location of the user, comprising:

a communications network operated by a carrier;

means for receiving information from the wireless communicator that indicates a geographic location of the wireless communicator when the wireless communicator communicates via the communications network;

means for obtaining user authorization to send the detected geographic location of the wireless communicator to a third party system;

means for sending the detected geographic location of the wireless communicator to the third party system, and wherein the third party system comprises means for comparing the detected geographic location of the wireless communicator with a geographic location of one or more items of interest to the user, and means for automatically notifying the user responsive to the geographic location of the wireless communicator when one or more items of interest to the user are located within a predetermined proximity of the detected geographic location of the wireless communicator.

28. The system according to claim 27, wherein the wireless communicator has a navigational system configured to determine a geographic location of the wireless communicator.

29. The system according to claim 28, wherein the navigational system of the wireless communicator comprises a global positioning system (GPS) receiver.

30. The system according to claim 27, wherein the communications network includes a short message service (SMS) and wherein the receiving means comprises means for receiving an SMS message from the wireless communicator.

31. The system according to claims 27, wherein the predetermined proximity of the geographic location of the wireless communicator is configurable by the user via the wireless communicator.

32. The system according to claim 27, wherein the communications network includes a short message service (SMS) and wherein the notifying means comprises means for automatically sending an SMS message to the wireless communicator responsive to the geographic location of the wireless communicator.

33. The system according to claim 27, wherein the notifying means comprises means for automatically sending a voice communication to the wireless communicator responsive to the geographic location of the wireless communicator.

34. The system according to claim 27, wherein the notifying means further comprises means for providing the user with additional information about the one or more items of interest that are located within a predetermined proximity of the detected geographic location of the wireless communicator.

35. The system according to claim 27, wherein interests of a user and geographic location information about items associated with user interests are maintained by the carrier.

36. The system according to claim 27, wherein the means for sending the detected geographic location comprises a means for sending the detected geographic location of the wireless communicator to the third party system if user authorization is obtained.

37. A wireless communicator that communicates via a communications network operated by a carrier, comprising:
    means for notifying the carrier of a geographic location of the wireless communicator;
    means for authorizing the carrier to send the location information to a third party; and
    means for automatically receiving information responsive to the geographic location of the wireless communicator about one or more items of interest to a user of the wireless communicator that are located within a predetermined proximity of the geographic location of the wireless communicator;
    wherein the means for notifying the carrier about a geographic location of the wireless communicator further comprises means for sending the geographic location information from the carrier to the third party.

38. The wireless communicator according to claim 37, further comprising a navigational system that is configured to determine a geographic location of the wireless communicator.

39. The wireless communicator according to claim 38, wherein the means for receiving information about one or more items of interest to the user comprises means for automatically receiving an SMS message responsive to the geographic location of the wireless communicator.

40. The wireless communicator according to claim 38, wherein the navigational system comprises a global positioning system (GPS) receiver.

41. The wireless communicator according to claim 37, wherein the communications network includes a short message service (SMS), and wherein the notifying means comprises means for sending an SMS message from the wireless communicator to the carrier.

42. The wireless communicator according to claim 37, wherein the predetermined proximity of the geographic location of the wireless communicator is configurable by the user via the wireless communicator.

43. The wireless communicator according to claim 37, wherein the means for receiving information about one or more items of interest to the user comprises means for receiving a voice communication.

44. The wireless communicator according to claim 37, wherein the means for receiving information about one or more items of interest to the user comprises means for automatically receiving the information responsive to the geographic location of the wireless communicator from the third party.

45. The wireless communicator according to claim 37, further comprising means for registering one or more user interests with the carrier.

46. The wireless communicator according to claim 37, further comprising means for registering one or more user interests with the third party.

47. The method according to claim 37, wherein the means for sending the detected geographic location comprises a means for sending the detected geographic location of the wireless communicator to the third party system if user authorization is obtained.

48. A communications device that communicates via communications network operated by a carrier, comprising:
    means for sending an identification of a geographic location to the carrier;
    means for authorizing the carrier to send the location information to a third party;
    means for automatically receiving information responsive to the geographic location about one or more items of interest to a user of the communications device that are located within a predetermined proximity of the identified geographic location.

49. The communications device according to claim 48, wherein the communications network includes a short message service (SMS), and wherein the sending means comprises means for sending an SMS message from the communications device to the carrier.

50. The communications device according to claim 49, wherein the means for receiving information about the one or more items of interest to the user comprises means for automatically receiving an SMS message responsive to the geographic location.

51. The communications device according to claim 48, wherein the predetermined proximity of an identified location is configurable by the user via the communications device.

52. The communications device according to claim 48, wherein the means for receiving information about one or more items of interest to the user comprises means for automatically receiving a voice communication responsive to the geographic location.

53. The communications device according to claim 48, wherein the sending means comprises means for sending the identified geographic location to a third party, and wherein the receiving means comprises means for automatically receiving information responsive to the geographic location about one or more items of interest to the user that are located within a predetermined proximity of the identified geographic location from the third party.

54. The communications device according to claim 53, further comprising means for registering one or more user interests with the third party.

55. The communications device according to claim 48, further comprising means for registering one or more user interests with the carrier.

56. A computer program product that identifies items of interest to a user of a wireless communicator that are within a predetermined proximity of a geographic location of the user, wherein the wireless communicator communicates via a communications network operated by a carrier, the computer program product comprising a computer usable storage medium having computer readable program code embodied in the medium, the computer readable program code comprising:

computer readable program code that detects a geographic location of the wireless communicator;

computer readable program code that obtains user authorization to send the detected geographic location of the wireless communicator to a third party;

computer readable program code that sends the detected geographic location of the wireless communicator to the third party;

computer readable program code that compares the detected geographic location of the wireless communicator with a geographic location of one or more items of interest to the user; and computer readable program code that automatically notifies the user responsive to the geographic location of the wireless communicator when one or more items of interest to the user are located within a predetermined proximity of the detected geographic location of the wireless communicator.

57. The computer program product according to claim 56, wherein the wireless communicator is a radiotelephone and wherein the communications network is a cellular radiotelephone network having a plurality of geographically-dispersed base stations, and wherein the computer readable program code that detects a geographic location of the wireless communicator comprises computer readable program code that determines which base station the wireless communicator is in communications with.

58. The computer program product according to claim 56, wherein the predetermined proximity of a detected geographic location is configurable by the user via the wireless communicator.

59. The computer program product according to claim 56, wherein the communications network includes a short message service (SMS) and wherein the computer readable program code that notifies the user when one or more items of interest to the user are located within a predetermined proximity of the detected geographic location of the wireless communicator comprises computer readable program code that automatically sends an SMS message to the wireless communicator responsive to the geographic location of the wireless communicator.

60. The computer program product according to claim 56, wherein the computer readable program code that notifies the user when one or more items of interest to the user are located within a predetermined proximity of the detected geographic location of the wireless communicator comprises computer readable program code that automatically sends a voice communication to the wireless communicator responsive to the geographic location of the wireless communicator.

61. The computer program product according to claim 56, wherein the computer readable program code that notifies the user when one or more items of interest to the user are located within a predetermined proximity of the detected geographic location of the wireless communicator further comprises computer readable program code that provides the user with additional information about the one or more items of interest that are located within a predetermined proximity of the detected geographic location of the wireless communicator.

62. The computer program product according to claim 56, wherein interests of the user and geographic location information for items associated with user interests are maintained by the carrier.

63. The method according to claim 56, wherein the computer readable program code that sends the detected geographic location comprises computer readable program code that sends the detected geographic location of the wireless communicator to the third party system if user authorization is obtained.

64. A computer program product that identifies items of interest to a user of a wireless communicator that are within a predetermined proximity of a geographic location of the user, wherein the wireless communicator communicates via a communications network operated by a carrier, the computer program product comprising a computer usable storage medium having computer readable program code embodied in the medium, the computer readable program code comprising:

computer readable program code that receives information from the wireless communicator that indicates a geographic location of the wireless communicator;

computer readable program code that obtains user authorization to send the detected geographic location of the wireless communicator to a third party;

computer readable program code that sends the detected geographic location of the wireless communicator to the third party;

computer readable program code that compares the geographic location of the wireless communicator with a geographic location of one or more items of interest to the user; and computer readable program code that automatically notifies the user responsive to the geographic location of the wireless communicator when one or more items of interest to the user are located within a predetermined proximity of the geographic location of the wireless communicator.

65. The computer program product according to claim 64, wherein the communications network includes a short message service (SMS) and wherein the computer readable program code that receives information from the wireless communicator that indicates a geographic location of the wireless communicator comprises computer readable program code that receives an SMS message from the wireless communicator.

66. The computer program product according to claim 64, wherein the communications network includes a short message service (SMS) and wherein the computer readable program code that notifies the user when one or more items of interest to the user are located within a predetermined proximity of the geographic location of the wireless communicator comprises computer readable program code that automatically sends an SMS message to the wireless communicator responsive to the geographic location of the wireless communicator.

67. The computer program product according to claim 64, wherein the computer readable program code that notifies the user when one or more items of interest to the user are located within a predetermined proximity of the geographic location of the wireless communicator comprises computer readable program code that automatically sends a voice communication to the wireless communicator responsive to the geographic location of the wireless communicator.

68. The computer program product according to claim 64, wherein the computer readable program code that notifies the user when one or more items of interest to the user are located within a predetermined proximity of the geographic location of the wireless communicator further comprises computer readable program code that provides the user with additional information about the one or more items of interest that are located within a predetermined proximity of the detected geographic location of the wireless communicator.

69. The method according to claim 64, wherein the computer readable program code that sends the detected geographic location comprises computer readable program code that sends the detected geographic location of the wireless communicator to the third party system if user authorization is obtained.

70. A method of identifying items of interest to a user of a wireless communicator that are within a predetermined proximity of a geographic location of the user, wherein the wireless communicator communicates via a communications network operated by a carrier, the method comprising the following steps:

detecting a geographic location of the wireless communicator;

comparing the detected geographic location of the wireless communicator with a geographic location of one or more items of interest to the user;

automatically notifying the user responsive to the geographic location of the wireless communicator when one or more items of interest to the user are located within a predetermined proximity of the detected geographic location of the wireless communicator, the predetermined proximity of a detected geographic location being configurable by a user via the wireless communicator, wherein the carrier sends the detected geographic location of the wireless communicator to a third party, and wherein the comparing and notifying steps are performed by the third party; and     obtaining user authorization to send the detected geographic location of the wireless communicator to the third party.

71. The method according to claim 70, wherein the carrier sends the detected geographic location of the wireless communicator to the third party if user authorization is obtained.

\* \* \* \* \*